No. 720,615. PATENTED FEB. 17, 1903.
G. N. PIFER.
COMBINED FINDER AND MEANS FOR DETERMINING FOCAL DISTANCES.
APPLICATION FILED OCT. 25, 1901.
NO MODEL.
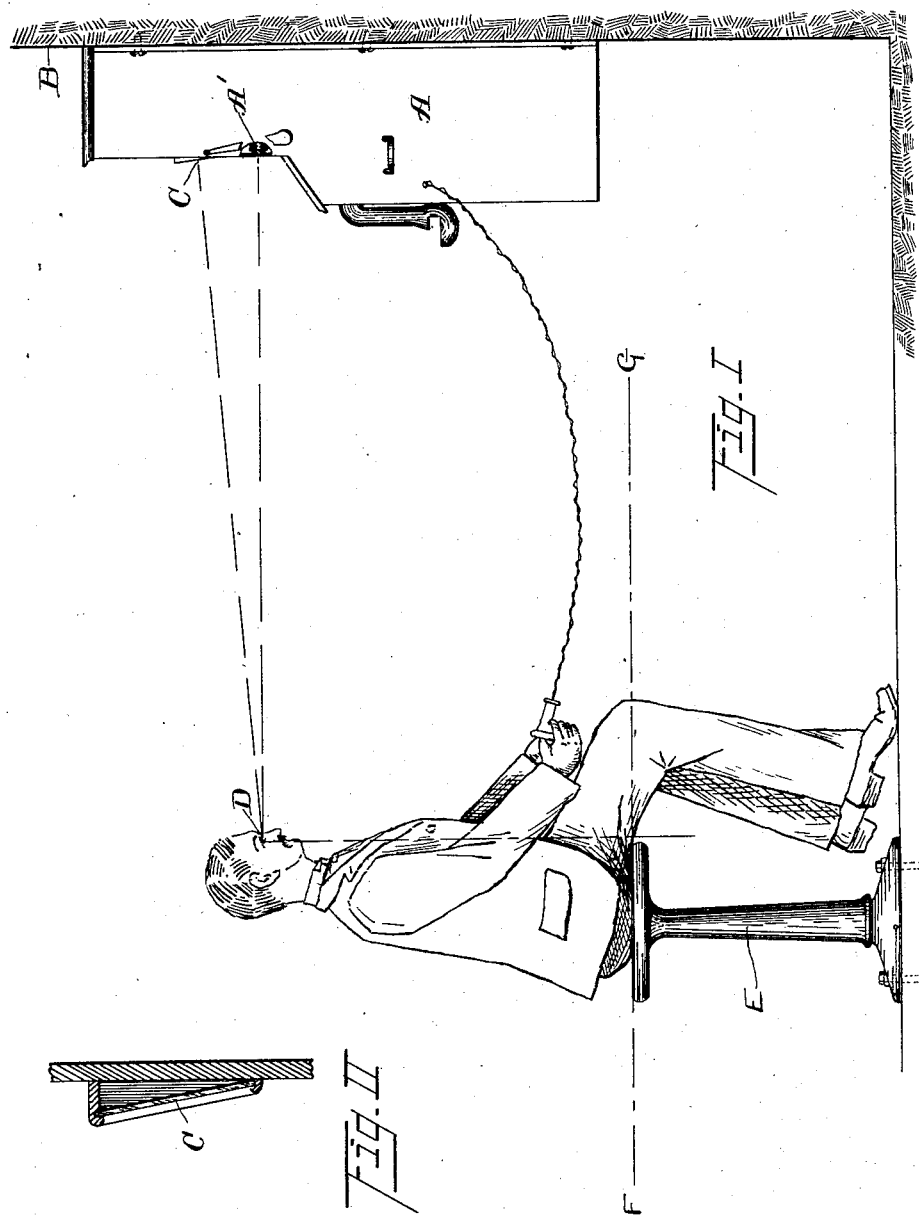
WITNESSES:
INVENTOR.

UNITED STATES PATENT OFFICE.

GEORGE N. PIFER, OF CLEVELAND, OHIO, ASSIGNOR TO THE AMERICAN AUTOMATIC PHOTOGRAPH COMPANY, OF CLEVELAND, OHIO, A CORPORATION OF OHIO.

COMBINED FINDER AND MEANS FOR DETERMINING FOCAL DISTANCES.

SPECIFICATION forming part of Letters Patent No. 720,615, dated February 17, 1903.

Application filed October 25, 1901. Serial No. 79,996. (No model.)

*To all whom it may concern:*

Be it known that I, GEORGE N. PIFER, a citizen of the United States, and a resident of Cleveland, county of Cuyahoga, and State of Ohio, have invented a new and useful Improvement in a Combined Finder and Means for Determining Focal Distances, of which the following is a specification, the principle of the invention being herein explained and the best mode in which I have contemplated applying that principle, so as to distinguish it from other inventions.

My invention relates to combined photographic finders and means for determining focal distances, its object being to provide such means for application to automatically-operated photographic apparatus.

Said invention consists of means hereinafter described, and specifically set forth in the claims.

The annexed drawings and the following description set forth in detail certain mechanism embodying the invention, such disclosed means constituting but one of various mechanical forms in which the principle of the invention may be used.

In said annexed drawings, Figure I represents a side elevation of an automatically-operated photographic apparatus, illustrating a subject in position in front of the camera. Fig. II represents a vertical sectional view of the mirror, mirror-frame, and adjacent portion of the camera as constructed and located in my invention.

The photographic apparatus A is suitably located, being preferably fixed to a wall B, so as to bring the axial line of the lens into a horizontal position. Immediately above the lens A' and fixed to the outside of the apparatus-casing is a mirror C, located in an inclined position such that a line perpendicular to its reflecting-surface will incline downwardly, as illustrated by the line C D. Said mirror is further located so as to cause such perpendicular line, preferably that projected from the mirror's center, to intersect the projected axial line A' D of the lens. The inclination of the mirror is further such that the distance A' D is that required to produce the required focal length of the lens to produce an image of the required degree of sharpness. The image of a subject placed at or approximately at the point D will hence be properly produced at the required plane in the camera. In order to cause the subject to assume such position, a stool E is fixed to the floor, and hence relatively to the camera, of a height and having a position such that it will cause the middle of the face of a subject of average physical conformation to be located at the point D when such subject is normally seated upon the stool. The latter hence forms a horizontal plane F G, which is fixed relatively to the point of intersection D, and hence substantially fixes the position of the subject's face when seated thereon and approximately determines said point D. The above-described arrangement hence permits successive subjects to assume an approximately correct position by merely seating themselves upon the stool and then finding the facial image in the mirror. The focal length of the lens may hence, as is required, be made constant, thereby eliminating the necessity of focusing by changing the distance of the lens from the sensitized plate and contributing to the required simplicity of operation of apparatus of this character.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In an automatic photographic apparatus, the combination with a camera-box, of a mirror located on the outside thereof above the lens, and at an angle thereto, whereby the proper focal distance is determined, as herein set forth.

2. In an automatic photographic apparatus, the combination with a camera-box, of a mirror located on the outside thereof, above the lens, and at an angle thereto, said mirror being adjustable to the desired angle, as herein set forth.

3. In an automatic photographic apparatus, the combination with a camera-box, of a mirror located on the front thereof, and above the lens at an angle thereto, said mirror being movable, and adjustable to the desired angle to determine the proper focal distance, as herein set forth.

Signed by me this 22d day of October, 1901.

GEORGE N. PIFER.

Attest:
A. E. MERKEL,
D. T. DAVIES.